Patented Nov. 13, 1945

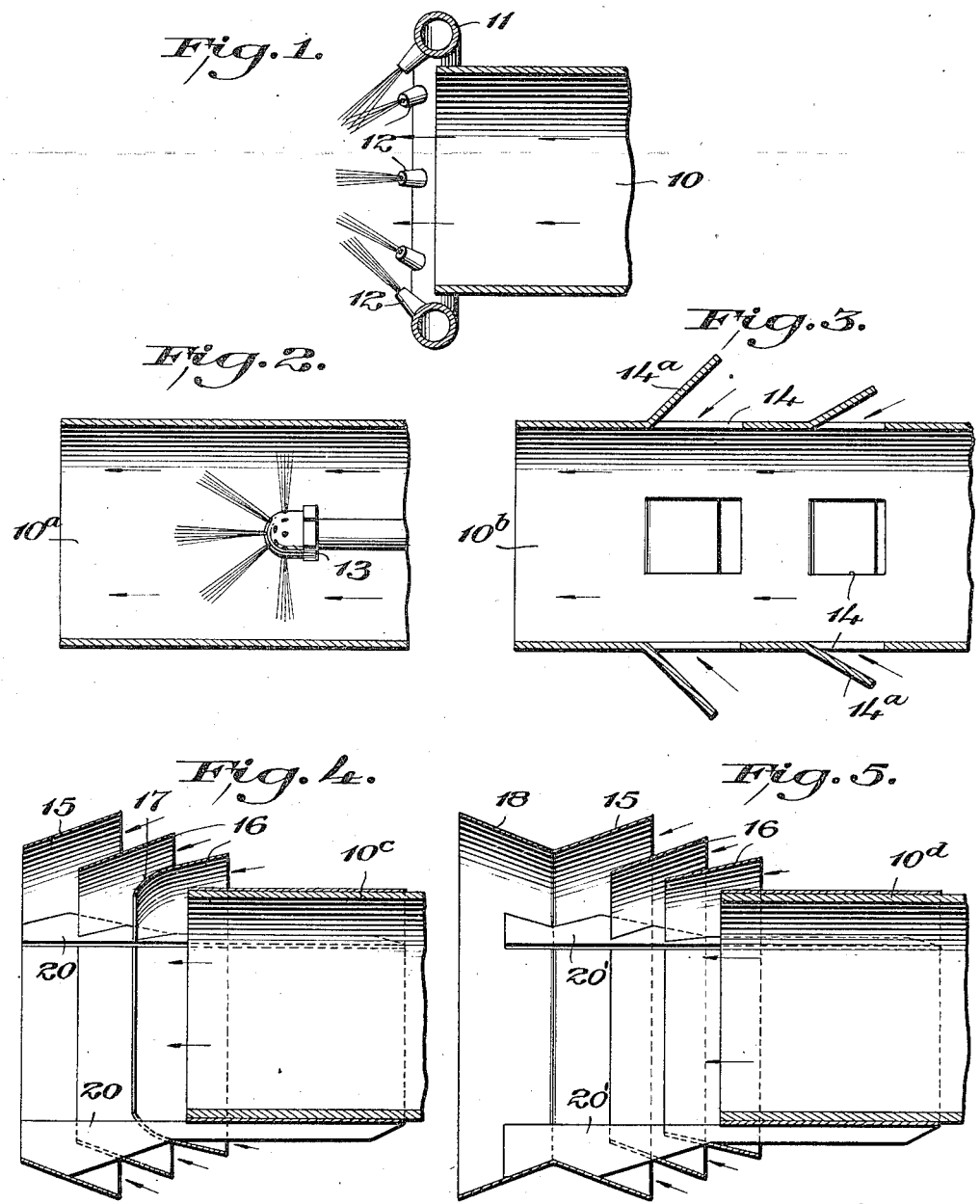

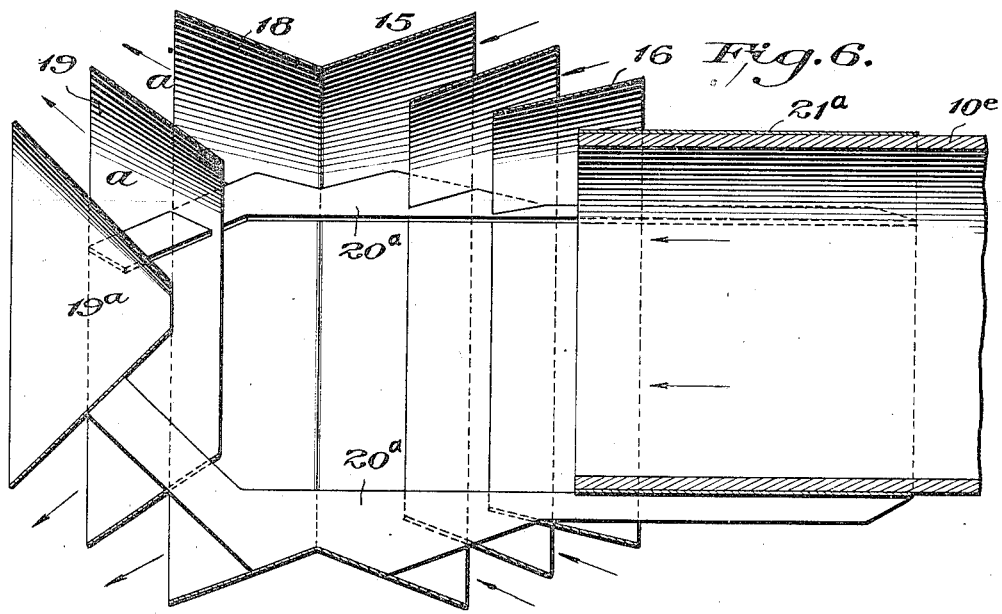
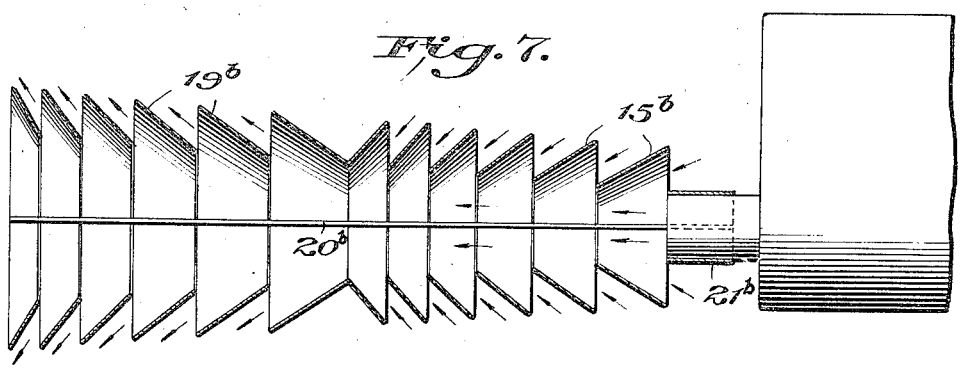
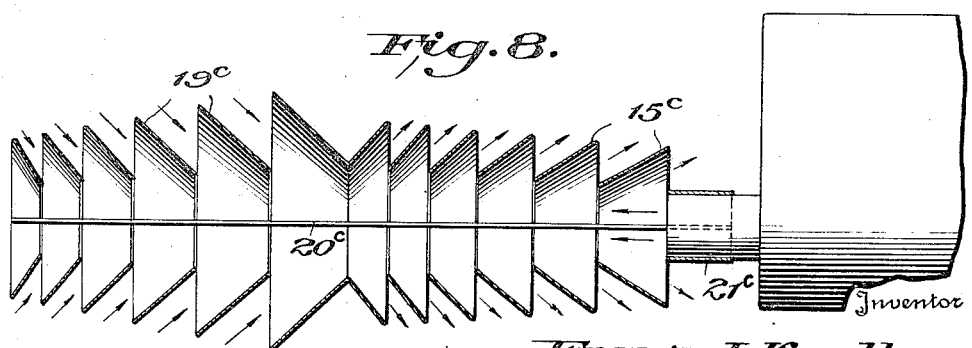

2,389,059

UNITED STATES PATENT OFFICE 2,389,059

MEANS FOR TREATING INFLAMMABLE GASES

Franz J. Kurth, New York, N. Y., assignor to Anemostat Corporation of America, New York, N. Y., a corporation of Delaware Application June 1, 1942, Serial No. 445,346

9 Claims. (Cl. 181—43)

This invention relates to a means for treating inflammable gases, such as the exhaust gases of internal combustion engines and the powder gases of guns, and has for its primary object to provide a simple, practical method and means of rendering such gases noninflammable, particularly at the discharge ends of the exhaust conduits of aircraft engines and at the muzzles of guns to eliminate highly objectionable flame at these locations.

Another important object of the invention is to provide a method and means for the primary purpose stated which serves additionally, in connection with the exhaust conduits of internal combustion engines, to reduce the pressure in such conduits, thereby to increase the power of the engines and to promote their efficiency; also, to eliminate or at least materially reduce a primary cause of backfiring and to reduce exhaust noises by diffusing exhaust sound waves.

Another important object of the invention is to provide a means for the purposes stated embodying a construction such that, when it is associated with an inflammable gas conduit that is subjected in any manner to a flow of air therealong, as for example, in the case of aircraft-carried guns and aircraft engine exhaust conduits which are subjected to air flow therealong by operation of the aircraft propeller or due to movement of the aircraft through the atmosphere, utilizes such air flow to accomplish its purposes.

With the foregoing and various other objects in view, which will become more fully apparent as the nature of the invention is better understood, the same consists in a method and means embodying the features of novelty as will be hereinafter more fully described, illustrated in the accompanying drawings and particularly defined in the appended claims.

In the accompanying drawings, wherein like characters of reference denote corresponding parts in related views:

Figure 1 is a longitudinal sectional view through the discharge end portion of an inflammable gas conduit and an associated conventional means for practicing the method and accomplishing the purposes of the invention.

Figure 2 is a view similar to Fig. 1 illustrating another means for practicing the method and accomplishing the purposes of the invention.

Figure 3 is another view similar to Fig. 1 illustrating another means for practicing the method and accomplishing the purposes of the invention.

Figure 4 is still another view similar to Fig. 1 illustrating still another means for practicing the method and accomplishing the purposes of the invention.

Figure 5 is a view similar to Fig. 4 illustrating as an addition to the structure shown in said figure a venturi means for accelerating flow of gases from the inflammable gas conduit.

Figure 6 is a view similar to Fig. 5 illustrating as an addition to the structure shown in said figure means for diffusing the diluted gases.

Figure 7 is a view similar to Fig. 1 showing a means especially adapted for use on stationary machine guns or on the rear machine guns of aircraft, for accomplishing the purposes of the invention; and Figure 8 is a view similar to Fig. 7 showing a means especially adapted for use to accomplish the purposes of the invention when used on aircraft-carried guns or other guns that in use may be advanced through the atmosphere with their muzzles disposed forwardly.

The basic principles of the present invention are either the dilution of an inflammable gas by a noninflammable gas, sufficient in quantity to render the inflammable gas non-inflammable; the cooling of an inflammable gas by the intermixture therewith of another gas or other medium so cold as to reduce the temperature of the inflammable gas to such a low degree as to render it non-inflammable, or both the dilution and cooling of an inflammable gas by another gas or other medium so that the combined dilution and cooling render the inflammable gas non-inflammable.

The invention is particularly concerned with the treatment of inflammable gases, such as powder gases and the exhaust gases of internal combustion engines, which flow to the atmosphere along confined paths, as for example, through gun barrels and exhaust pipes, either of which for purposes of the present description and claims may be regarded as an inflammable-gas conduit, and the primary purpose of the treatment is to render such gases non-inflammable either as they flow along or as they leave the discharge end of their conduit so that any flame at the discharge end of their conduit is avoided.

Figure 1 of the drawings illustrates conventionally one manner and means of carrying the invention into practice. In said figure, 10 designates an inflammable-gas conduit and 11 designates a hollow ring or manifold disposed concentrically with respect to said conduit 10 is surrounding relationship to the discharge end portion thereof and having suitable outlet means 12 so that a gas or other fluid medium which may be supplied to said ring in any suitable manner will be delivered therefrom in the form of a surrounding or substantially surrounding stream into inflammable gases as they are discharged from said conduit 10.

The gas or other fluid medium supplied to and delivered from the ring 11 may be so relatively cold as to act solely by its cooling effect upon the inflammable gases to sufficiently reduce the temperature of the latter to render them non-inflammable in the atmosphere immediately after their discharge from the conduit 10 and until they have become so dissipated in the atmosphere as to be no longer inflammable, and in this way any flame at the discharge end of said conduit 10 will be prevented even though the cooling gas or other cooling medium may itself be inflammable. Alternatively, the gas or other fluid medium supplied to and delivered from the ring 11 may be non-inflammable and of either a higher or a lower temperature than the inflammable gases discharged from the conduit 10 and by its dilution of the inflammable gases as they leave said conduit will serve to render said inflammable gases non-inflammable immediately after leaving said conduit and until they have become so dissipated in the atmosphere as to be no longer inflammable, and also in this way any flame at the discharge end of the conduit 10 will be prevented. Preferably, however, the gas or other fluid medium supplied to and delivered from the ring 11 is both non-inflammable and of a sufficiently lower temperature than the inflammable gases issuing from the conduit 10 so that both diluting and cooling of the inflammable gases are factors in rendering said gases non-inflammable in the atmosphere immediately after leaving the conduit 10 and until they have become so dissipated in the atmosphere as to avoid the possibility of any flame at the discharge end of said conduit 10.

The invention contemplates the supply to and the delivery from the ring 11 of either a cooling or a diluting or a combined cooling and diluting gas or other fluid medium under a pressure sufficient to insure delivery of a required quantity of said gas or other fluid medium in a sufficiently brief period of time to accomplish the purpose of the invention, and in this connection it is apparent that the outlet means 12 may be designed to direct the treating gas or other fluid medium into the inflammable gas either in a direction at right angles to the direction of flow of the inflammable gas or more or less counter to or in the same general direction as the direction of flow of the inflammable gases, whereby the treating gas or other fluid medium may be caused to intermix with and act most thoroughly and effectively upon the inflammable gases. Preferably, however, in the case of internal combustion engine exhaust gases being treated, the treating gas or other fluid medium has a direction of flow inwardly and more or less in the same direction as the exhaust gases to accelerate flow of the latter gases and thus reduce pressure in the exhaust conduit, both to the end of relieving back pressure on the engine and thus promoting engine efficiency and of reducing back-firing which is due largely to accumulation and consequent explosion of gases in the exhaust conduit. Obviously, the ring 11 may be disposed either in surrounding relationship to the conduit 10 as shown, or beyond the discharge end of said conduit.

Instead of delivering the treating gas or other fluid medium to the inflammable gases in the form of a surrounding or substantially surrounding stream or streams, the treating gas or other fluid medium may be delivered to the inflammable gases interiorly thereof, as for example, through a spray nozzle 13 located in the path of flow of the inflammable gases as illustrated in Fig. 2 of the drawings. Obviously, the nozzle 13 or its equivalent may be located as shown within the inflammable gas conduit, designated as 10ª, or it may be located beyond the discharge end of said conduit, and may be designed and arranged to discharge the treating gas or other fluid medium in any desired direction or directions relative to the direction of flow of the inflammable gases.

In cases where an inflammable-gas conduit moves through the atmosphere or is subjected in any other manner to flow of air along the outside thereof, as for example, in the case of aircraft-carried guns and aircraft engine exhaust conduits which are subjected to air flow along the outsides thereof by operation of the aircraft propeller or due to movement of the aircraft through the atmosphere, the invention contemplates utilization of the air flowing along the outside of the inflammable gas conduit as the gas for treating the inflammable gases by diluting and cooling them to accomplish the purposes of the invention, and in this connection any suitable means may be provided to direct the treating air into the inflammable gases either during flow of the inflammable gases through their conduit or as they leave their conduit to render them non-inflammable immediately after leaving their conduit, thereby to avoid flame at the discharge end of the conduit.

One means of utilizing air flowing along the outside of an inflammable-gas conduit, such as an aircraft engine exhaust conduit, in the same direction as flow of inflammable exhaust gases from the conduit is illustrated in Fig. 3 of the drawings as comprising air admission openings, designated as 14, in the conduit, designated as 10ᵇ, and vanes 14ª extending diagonally outwardly and forwardly from the rear ends of the air admission openings 14 so as to intercept and deflect through said openings into the conduit and into inflammable exhaust gases flowing through the latter some of the air which flows along the outside of said conduit. The openings 14 are sufficiently numerous or are of sufficient total area to admit the required quantity of air to the conduit, under the pressure derived from the travel of the air along the outside of the conduit, to insure sufficient dilution and cooling of the inflammable exhaust gases to render them non-inflammable in the atmosphere when they leave the discharge end of the conduit and in this way any flame at or beyond the discharge end of the conduit is avoided. Moreover, the diluting and cooling air has generally the same direction of flow as the inflammable exhaust gases, and if its velocity is greater than the velocity of the inflammable exhaust gases, as usually it is in the case of an aircraft engine exhaust conduit due either to the propeller slip stream when the aircraft is at rest or to both the propeller slip stream and advance of the aircraft when the latter is in flight, it serves to accelerate the flow of the exhaust gases with the advantages aforementioned in connection with the means illustrated in Fig. 1 for carrying out the invention.

Another means of utilizing air flowing along the outside of an inflammable gas conduit in the same direction as flow of inflammable gases through the conduit to accomplish the purposes of the invention is illustrated in Fig. 4 of the drawings as comprising an open-ended, hollow, tapering member 15 suitably mounted on or adjacent to the discharge end portion of the conduit, designated as 10ᶜ, preferably in axial alinement with said conduit, with its larger end, which is of greater diameter than the conduit, facing counter to the direction of flow of air traveling along the outside of said conduit and with its smaller end, which preferably is of a diameter at least as great as the diameter of the conduit, disposed relative to the discharge end of the conduit so that air which is deflected inwardly by said tapering member is directed into inflammable gases as they leave the discharge end of the conduit to dilute and cool them and thus render them non-inflammable.

If desired, and as also is illustrated in Fig. 4 of the drawings, one other or a plurality of other open-ended, hollow, tapering members 16 may be disposed inwardly of the member 15 and may be spaced therefrom and from each other in case there is a plurality of them, to direct a number of streams of diluting and cooling air into inflammable gases as they leave the discharge end of the conduit 10ᶜ, and as is apparent the members 15, 16 may have different amounts of taper to direct the different streams of treating air in different directions into the inflammable gases to most effectively dilute and cool them.

The tapering member 15, either alone or in association with one or more additional tapering members such as the tapering member or members 16, forms, in effect, a continuation of the conduit 10ᶜ and therefore the means illustrated in Fig. 4 is substantially the equivalent of the means illustrated in Fig. 3 for accomplishing the purposes of the invention. In other words, the conduit alone, or the conduit in combination with the tapering member 15 or the tapering members 15 and 16, provides a confined path of flow for the inflammable gases and the treating air is delivered to the inflammable gases during their flow along said confined path.

Air supplied through the tapering member 15 or through the tapering members 15, 16, as the case may be, may have the same general direction of flow as the inflammable gases and therefore may act to accelerate flow of such gases with the advantages aforementioned. Alternatively, the smaller end portion of any one or more of said members 15 or 16 may be directed more or less inwardly as indicated at 17 in Fig. 4 of the drawings to direct air at any desired angle into the inflammable gases. In any event, an open-ended, hollow, flaring member 18 may be joined at its smaller end to the smaller end of the tapering member 15, as illustrated in Fig. 5 of the drawings, to provide a venturi structure to accelerate flow of inflammable gases through the inflammable gas conduit, designated as 10ᵈ, and through the tapering member 15 or the tapering members 15 and 16 as the case may be. Moreover, as illustrated in Fig. 6 of the drawings, one or more smaller, open-ended, hollow flaring members 19 may be spaced inwardly from the flaring member 18 to deflect the diluted gases outwardly and thus promote their rapid diffusion in the atmosphere. In addition, an innermost flaring member 19ᵃ closed at its smaller end preferably is provided to form the inner wall of the innermost of the flaring passageways a through which the diluted gases flow to the atmosphere and also to act as a shield to hide from the view of a person located rearwardly of said member any glowing gas in the conduit 10ᶜ. On the other hand, the end portions of the tapering and flaring members preferably overlap one another and thereby act as shields to prevent any glowing gas in the conduit 10ᶜ from being seen from a point at the side of and beyond the end of the conduit.

In a construction as illustrated in Fig. 6 all of the tapering and flaring members preferably have different amounts of taper and flare, respectively, to break up sound waves and thus reduce exhaust noises. However, regardless of their relative amounts of flare, said members serve effectively to intercept sound waves and thus to reduce exhaust noises.

According to any of the constructions illustrated in Figs. 4 to 6, the tapered members and the flaring members, if used, may be connected together in a unitary structure in any desired manner. For example, struts such as illustrated at 20, 20' and 20ᵃ in said figures, respectively, may be employed for that purpose and also to mount said members on a sleeve 21 to be engaged over and fastened to the discharge end portion of an inflammable gas conduit for the purpose of mounting the unitary device thereon, as shown in Fig. 6.

In a device as illustrated in Fig. 6 the flaring member 19ᵃ may be provided with a small central opening x of sufficiently large diameter to permit the passage therethrough of bullets or other projectiles fired from a gun upon which the device may be mounted, and in the case of a gun that is mounted on an aircraft or other vehicle for movement through the atmosphere with its muzzle trailing, the operation of the device to prevent flame at the muzzle of the gun will be the same as described in connection with the devices illustrated in Figs. 4 to 6. In fact, a device as illustrated in Fig. 6, may be used on stationary guns for accomplishing the purposes of the invention either by employing any suitable means for supplying air or other gas to said device for treating the powder gases issuing from the muzzle of the gun, or in the case of rapidly firing guns, such as machine guns, by utilizing the substantially continuous flow of powder gases from the muzzle of the gun to induce flow of air through the members 15, 16 into the powder gases for diluting and cooling them. Preferably, however, a device constructed in accordance with the invention for use in association with either stationary machine guns or machine guns which travel through the atmosphere with their muzzles trailing embodies, as illustrated in Fig. 7 of the drawings, a construction which fundamentally is the same as the Fig. 6 construction, except that the tapered members, designated as 15ᵇ, and the flaring members, designated as 19ᵇ, are more numerous and have a more pronounced spread apart relationship axially than the corresponding members of the Fig. 6 construction to impart greater length to the device and thereby afford ample time within which the diluting air or gases, which are drawn between the members 15ᵇ by the powder gases flowing forwardly through the device, may act to accomplish their purpose. In Fig. 7 the flaring members 15ᵇ, 19ᵇ are shown as being connected together and to a mounting sleeve 21ᵇ by suitable struts 20ᵇ.

Figure 8 illustrates a device for use on machine guns, such as the front machine guns of aircraft, which travel through the air with their muzzles disposed forwardly. This device is generally the same as the device illustrated in Fig. 7, except that the flaring members 19c located successively nearer the muzzle of the gun are of successively larger diameter so as to deflect large quantities of air into the powder gases for diluting and cooling them, the spaces between the members 15c permitting free outflow of the diluted powder gases. In Fig. 8 the flaring members 15c, 19c are shown as being connected together and to a mounting sleeve 21c by suitable struts 20c.

Prevention of flame at the muzzle of a gun or at the discharge end of the exhaust conduit of an aircraft has the important military advantage that the location of the gun or the aircraft is not disclosed to an enemy by any such flame. In addition, fire hazards are correspondingly reduced; dilution of exhaust gases reduces the danger of monoxide poisoning, and avoidance of exhaust flame on both military and commercial aircraft has a favorable psychological effect on crew and passengers.

I claim:

1. In combination with an inflammable-gas conduit, a plurality of open-ended hollow tapering members disposed substantially in axial alinement with one another and with said conduit and located adjacent to the gas outlet end of said conduit and spaced outwardly from said conduit and from one another and tapering in the direction of flow of gases discharged from said conduit and having successively greater amounts of taper, whereby air flowing along said conduit toward its discharge end is divided into separate streams and said streams are deflected at different angles into gases discharged from said conduit to dilute them.

2. In combination with an inflammable-gas conduit, an open-ended hollow tapering member disposed substantially in axial alinement with said conduit adjacent to the outlet end thereof and tapering in the direction of flow of gases discharged from said conduit and having its larger end of greater cross sectional area than the outlet end portion of said conduit, whereby air flowing along the outside of said conduit toward its gas discharge end is deflected into gases discharged from said conduit to dilute them, and a plurality of sucessively smaller open-ended hollow flaring members spaced successively inwardly of one another and the larger or outermost of which has its smaller end joined to the smaller end of said hollow tapering member, thereby to provide a combined venturi and air diffusing structure to accelerate flow of diluted gases from the outlet end of said conduit and to diffuse said gases.

3. In combination with an inflammable-gas conduit, an open-ended hollow tapering member disposed substantially in axial alinement with said conduit adjacent to the outlet end thereof and tapering in the direction of flow of gases discharged from said conduit and having its larger end of greater cross sectional area than the outlet end portion of said conduit, whereby air flowing along the outside of said conduit toward its gas discharge end is deflected into gases discharged from said conduit to dilute them, an open-ended hollow flaring member joined at its smaller end to the smaller end of said tapering member to provide a venturi structure to accelerate flow of diluted gases from the discharge end of said conduit, and means for diffusing the diluted gases comprising at least one other open-ended hollow flaring member spaced inwardly from said first hollow flaring member and another flaring member closed at its inner end and spaced inwardly from said second mentioned hollow flaring member.

4. In combination with an inflammable-gas conduit, an open-ended hollow tapering member disposed substantially in axial alinement with said conduit adjacent to the outlet end thereof and tapering in the direction of flow of gases discharged from said conduit and having its larger end of greater cross sectional area than the outlet end portion of said conduit, whereby air flowing along the outside of said conduit toward its gas discharge end is deflected into gases discharged from said conduit to dilute them, an open-ended hollow flaring member joined at its smaller end to the smaller end of said tapering member to provide a venturi structure to accelerate flow of the diluted gases from the discharge end of said conduit, at least one other flaring member spaced inwardly from said first mentioned flaring member to effect outward deflection and diffusion of the diluted gases, said second mentioned flaring member having a degree of flare different from the flare of said first mentioned flaring member, and at least one other open ended hollow tapering member spaced inwardly from said first mentioned tapering member and having a degree of taper different from the taper of said first mentioned tapering member to direct diluting air into the inflammable gases in a direction different from the direction of flow of the air directed into said gases by said first mentioned tapering member.

5. In combination with a conduit for gases of combustion, at least one open-ended hollow tapered member disposed substantially in axial alinement with said conduit adjacent to the outlet end thereof and tapering in the direction of flow of gases discharged from said conduit and having its larger end of greater cross sectional area than the outlet end portion of said conduit, whereby air flowing along the outside of said conduit toward its discharge end is deflected into gases discharged from said conduit to dilute them, and at least one open-ended hollow flaring member disposed substantially in axial alinement with said tapered member adjacent to the smaller or outlet end of the latter and flaring in the direction of flow of the gases and having its smaller end of smaller size than the smaller end of said tapered member to effect outward deflection and diffusion of the diluted gases.

6. The combination as set forth in claim 5 in which the smaller end of the tapered member is of greater cross sectional area than the outlet end portion of the conduit to permit expansion of the gases as they issue from the conduit.

7. In combination with a conduit for gases of combustion, a plurality of successively larger open-ended hollow tapered members located adjacent to the outlet end of said conduit and disposed substantially in axial alinement with one another and with said conduit and spaced axially in the direction of flow of the gases and tapering in the direction of flow of the gases issuing from the conduit, whereby air flowing along the conduit toward its discharge end is divided into separate streams and said streams are deflected inwardly into gases discharged from the conduit to dilute them, said members successively having greater amounts of taper to direct the successive diluting air streams more directly into the gases, and a plurality of successively smaller open-ended hollow flaring members disposed beyond the larger of said tapered members in axial alinement therewith and in the path of flow of the diluted gases to divide the same into separate flaring streams and to thus diffuse them.

8. The combination as set forth in claim 7 in which the smaller ends of the successively larger tapered members are successively larger and the smaller of which is of greater cross sectional area than the discharge end of the conduit to permit the gases to expand immediately upon issuing from the conduit.

9. In combination with a conduit for inflammable gas, means for supplying to inflammable gas as it leaves the outlet end of said conduit a diluting non-inflammable gas sufficient in quantity to render said inflammable gas non-inflammable in the atmosphere immediately after leaving said conduit, and means beyond said first mentioned means for diffusing the diluted gas, said last named means comprising a plurality of successively smaller open-ended hollow flaring members disposed in the path of flow of the diluted gas.

FRANZ J. KURTH.